INVENTOR
PETER SMITH

*INVENTOR*
PETER SMITH

United States Patent Office 3,151,299

Patented Sept. 29, 1964

3,151,299

DISABLING CIRCUIT FOR CONTROLLING THE OUTPUT IN ACCORDANCE WITH FREQUENCY AND AMPLITUDE OF THE INPUT

Peter Smith, Glendola, N.J., assignor to Dynamics Corporation of America, New York, N.Y., a corporation of New York Filed Feb. 8, 1962, Ser. No. 171,971

1 Claim. (Cl. 328—54)

This application relates generally to electronic disabling circuits and more particularly to a circuit for use with pulsating input signals wherein extraneous signals appearing at the input of the circuit result in the prevention of any output from the circuit.

In many types of electronic equipment in use today, one of the major problems encountered is that which results from extraneous and unwanted signals being inserted into the electrical circuitry resulting in inaccurate outputs which seriously limit the usefulness of the circuit. Elimination of noise and other extraneous signals has been accomplished by various means which are now well known in the industry. The primary method used at the present time for noise elimination employs a feedback circuit or a differential device for cancellation of the interfering signal. This type of noise elimination often requires additional components which not only add to the size of the equipment but often greatly increase the cost thereof.

The present invention is directed to a circuit wherein the extraneous signals are not eliminated within the circuit, but are used in a novel manner in order to cut off the output from the circuit so that the only signals delivered to the load are those representative of the intended input signals without the presence of any extraneous signals.

This method of handling extraneous signals would be practical in many systems in use today such as systems wherein highly delicate instruments are used to measure the signal components and extraneous signals of considerably greater amplitude could cause harm to these measuring instruments. Additionally, the type of circuit disclosed in the present invention would be useful in servo systems wherein there is generated an unwanted high frequency response in the feedback causing a continual signal variation which results in the well-known hunting of the servo system.

The circuit of the present invention has also proved highly satisfactory in apparatus using a transducer to provide the signal input. Undesirable transducer activity produces artifact components which are introduced into the system itself, thus giving inaccurate results which are difficult to read.

Accordingly, an object of the present invention is to provide a circuit for controlling the output thereof in accordance with the frequency and amplitude of a pulsating input.

Another object of this invention is to provide a circuit wherein pulsating inputs above a predetermined pulse repetition rate cut off the output from the circuit.

Yet another object of this invention is to provide a circuit for coupling pulse inputs having a relatively low pulse repetition rate to an output device and wherein input signals above a predetermined frequency prevent activation of the output device.

A further object of this invention is to provide a circuit for coupling relatively low frequency pulses to an output device with means provided wherein extraneous signals above a predetermined frequency prevent activation of the output device.

Yet another object of this invention is to provide a circuit which will pass noise free low frequency input signal pulses but will prevent passage of any signal containing noise components above a predetermined frequency.

A still further object of this invention is to provide an extraneous signal elimination circuit having relatively few components with a resultant economy of manufacture.

These and other objects will become apparent from the following description when taken in conjunction with the drawings wherein.

Figure 1:
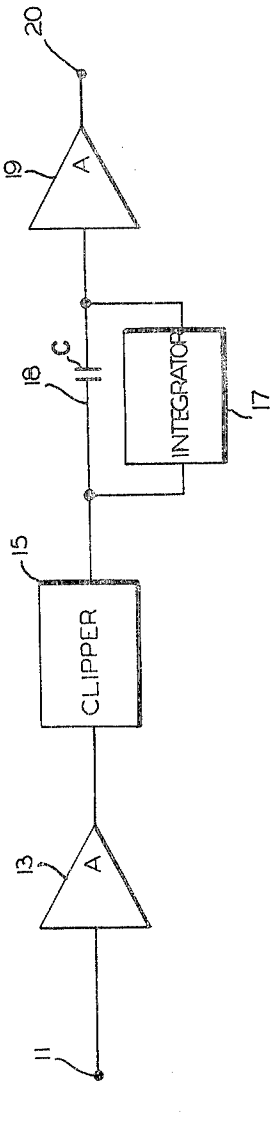
FIG. 1 is a diagrammatic representation of the components of the circuit of the present invention.

Turning now more specifically to the drawings, FIG. 1 shows an amplifier 13 connected to input terminal 11. The output of the amplifier is fed to a pulse clipper 15 which is designed to limit the amplitude of the pulses of one polarity. The output of clipper 15 is fed to the second amplifier 19 and the output of the amplifier 19 appears at the output terminal 20. An integrator 17 is connected in parallel with the lead 18 and is also fed from the clipper 15. The integrator is designed to integrate pulses of a polarity opposite to those affected by the clipper and the output of the integrator is fed into the input to the second amplifier 19. Accordingly, the control input of amplifier 19 is responsive to the clipped input signal and the output of the integrator if any such output exists.

Figure 2:
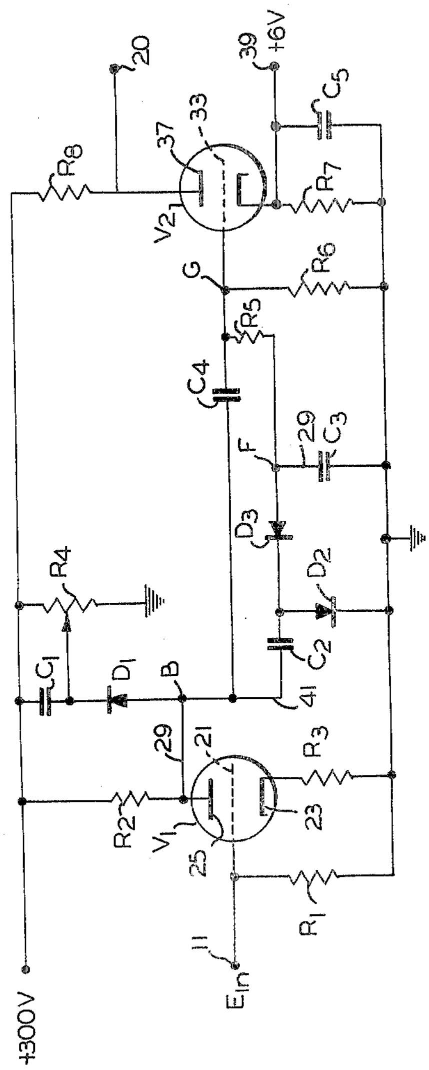
FIG. 2 is a schematic representation of the circuitry used in one embodiment of the present invention.

FIG. 2 shows one illustrative embodiment of a circuit employing the components depicted in FIG. 1. A pulsating input signal appears at the input terminal 11 for providing a signal at the grid 21 of triode amplifier $V_1$. Amplifier $V_1$ includes associated grid bias resistor $R_1$, cathode bias resistor $R_3$ and plate load resistor $R_2$ which is connected to a positive bias supply terminal 27. The output of amplifier $V_1$ is taken through lead 29 and the positive polarity amplitude of the pulses is limited by the clipper which includes diode $D_1$, capacitor $C_1$ and the variable resistance $R_4$. The clipping level for the pulses may be selected by adjustment of the variable resistor $R_4$.

The clipped voltage pulses pass through coupling capacitor $C_4$ to the grid 33 of triode amplifier $V_2$. The bias for cathode 35 of amplifier $V_2$ is provided by means of a positive voltage supply and cathode bias resistor $R_7$ with the plate 37 having associated plate resistor $R_8$. The output from amplifier $V_2$ is taken from output terminal 20.

The integrating circuit is connected in parallel with the coupling capacitor $C_4$. This circuit is comprised of capacitor $C_2$, diodes $D_2$ and $D_3$, capacitor $C_3$ and resistor $R_5$. Any positive polarity pulses appearing in lead 41 will be blocked by diode $D_3$ and pass to ground through diode $D_2$. The negative components of the pulses appearing in lead 41 are passed by diode $D_3$ and blocked by diode $D_2$. These negative going components charge capacitor $C_3$, thus building up a negative charge thereon. When capacitor $C_3$ discharges through resistor $R_5$ the resultant voltage will be added to the voltage reference of the grid 33. Accordingly, it can be seen that if no negative going pulses are present in the input signal, the integrator will have no effect on the output of the amplifier and the signal input pulses will appear at terminal 20. However, with negative components in the input which are of a sufficient frequency to affect the integrator, the D.C. grid voltage will be reduced and the positive clipped pulses will not be of a magnitude sufficient to reach the point of conductivity of amplifiers $V_2$. This operation is explained more thoroughly in connection with the graphs of FIGS. 3, 4 and 5.

The results of graphs 3, 4 and 5 were obtained with the use of this circuit in the device shown and described in U.S. patent application Serial No. 58,115 entitled "Blood Pressure Follower," filed September 20, 1960, and assigned to the assignee of the present invention. In that application a bimorph crystal is used in association with a digit to generate pulses representative of the arterial pulsations within the digit. Movement of the digit causes highly undesirable artifact signals which result in an erroneous output as read on the meter shown in that application. For further details concerning this type of arterial pulsation detection, reference is hereby made to that application. In effect, tube $V_1$ of FIG. 2 of the present invention is the same as the left triode of the double triode $V_3$ of the above entitled application while tube $V_2$ is the same as the right triode of the double triode $V_3$.

Figure 3A:
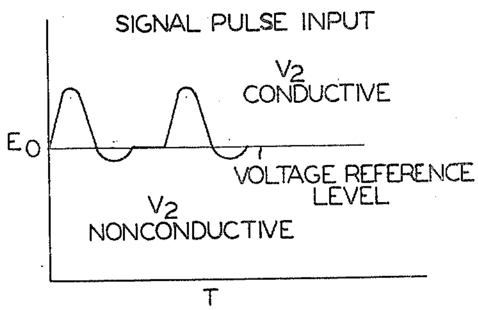
FIGS. 3, 4 and 5 are graphical representations of the voltage inputs and outputs of the circuit of the present invention.
Figure 3B:
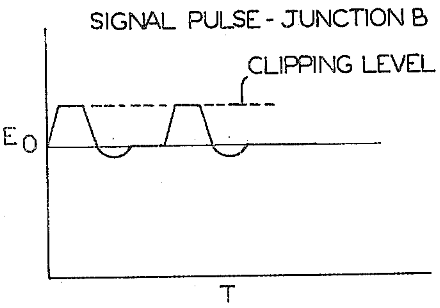
Figure 3C:
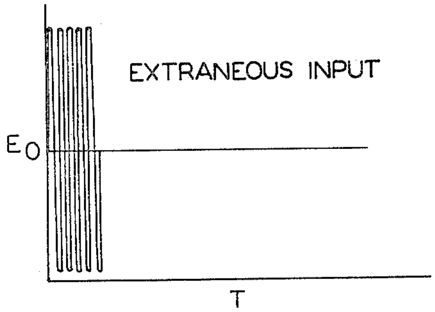
Figure 3D:
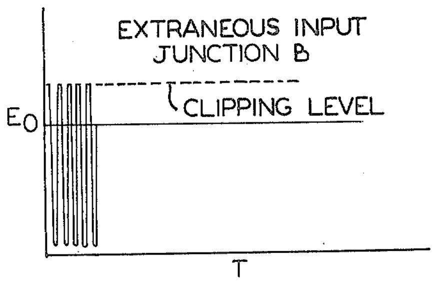
Figure 4:
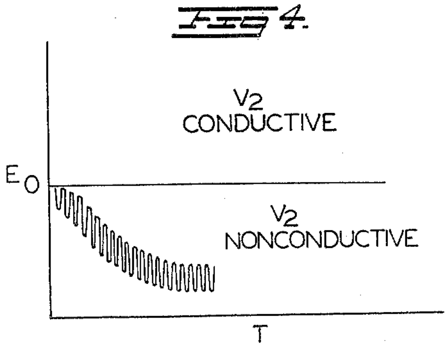
Figure 5:
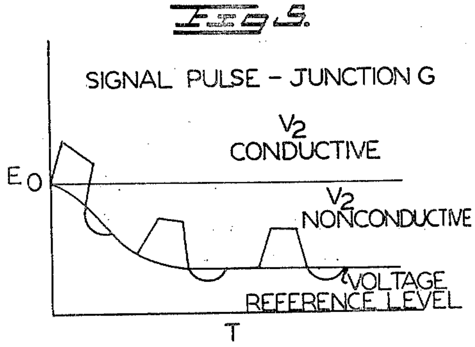

The following circuit parameters have proven to be highly satisfactory in this particular application and produced the results shown in FIGS. 3–5:

| | |
|---|---|
| $V_1$ | ½ 12 AT 7. |
| $V_2$ | ½ 12 AT 7. |
| $R_1$ | 1 meg. |
| $R_2$ | 1 meg. |
| $R_3$ | 2.2K. |
| $R_4$ | 100K variable. |
| $R_5$ | 1 meg. |
| $R_6$ | 2 meg. |
| $R_7$ | 820 ohms. |
| $R_8$ | 10K. |
| $C_1$ | 2 mfd. |
| $C_2$ | .02 mfd. |
| $C_3$ | .2 mfd. |
| $C_4$ | .2 mfd. |
| $C_5$ | 1000 mfd. |
| $D_1$ | PE 506. |
| $D_2$ | IN 34 A. |
| $D_3$ | IN 34 A. |

The basis of this invention resides in the fact that in applications wherein the signal input is a result of a relatively low pulse repetition rate, it has been found that noise components such as artifact generated in a transducer have a relatively high frequency and amplitude in comparison to the input signal pulse repetition rate. In the present example of the arterial pulse detection system, arterial pulsations occur with a repetition rate of from 50 to 200 pulses per minute while artifact resulting from finger movement and the like has a frequency greater than 400 cycles per minute and are of a much greater amplitude. Accordingly, the present invention deals with a combination of these two types of input voltages.

In FIG. 3*a* the signal input pulses are shown as they occur about a voltage reference level which, in the case of the present example of FIG. 2, is ground. This is also the conductive level of the tube $V_2$ since the grid 33 is also grounded. In FIG. 3*b* the resultant clipped pulses are shown as they appear at point B of FIG. 2. These clipped input signal pulses pass through coupling capacitor $C_4$, raising the grid voltage of $V_2$ so as to allow the amplifier to conduct.

FIG. 3*c* shows an extraneous input such as the artifact created in the transducer of the above mentioned application. It will be noted that this extraneous input is of a much higher frequency than the pulse repetition rate of the signal input pulses resulting from arterial pulsation. Because of the bimorph crystal used in detecting arterial pulsations, the negative going pulse has a lower amplitude than does the positive going pulse. However, the artifact input has approximately equal positive and negative input components.

FIG. 3*d* shows the resultant action of the clipping circuit which also affects the artifact input. Accordingly, the artifact signal also passes through coupling capacitor $C_4$ and raises the grid voltage, thus causing tube $V_2$ to become conductive. If this artifact signal is not removed, erroneous results will be obtained. However, the negative components of the artifact signal pass through the integrator and the resulting charging and discharging of capacitor $C_3$ is shown in FIG. 4. The voltage level at point F is reduced by the increments as shown until a particular level is reached depending upon the parameters of the circuit, and, thereafter, the voltage will fluctuate about a particular voltage level.

When the voltage output of the capacitor is passed through resistor $R_5$ it reduces the ground voltage reference level to a level having a negative value as indicated in FIG. 5. The positive input signal pulses vary about this newly created voltage reference level and, accordingly, will not render tube $V_2$ conductive after the voltage reference level has been reduced to the point where the maximum amplitude of the pulses is below the conductivity level of the tube.

The value of the clipping circuit also becomes apparent from FIG. 5. If no clipping circuit were used, any strong signal input voltages would still cause tube $V_2$ to become conductive unless the voltage reference level were extremely reduced. By clipping the positive going input signals, a predetermined reduction of the voltage reference level assures that no positive pulses will render the tube $V_2$ conductive.

It has been found that the operation of the circuit as described above is affected by the amplitude of the extraneous input signal only to the extent of the cut-off time for amplifier tube $V_2$. The higher the amplitude of the extraneous signal, the shorter will be the cut-off time, but as long as the signal is above the frequency determined by the parameters of the integrating circuit, the extraneous inputs will cause the tube to be nonconductive. When the artifact of the signal disappears, the voltage reference level will again return to ground and the input signal pulses will raise the voltage of the grid 33 and cause the tube $V_2$ to conduct. Accordingly, a means has been provided by this invention wherein the output of the circuit is cut-off when unwanted extraneous signals are present in the circuit, thus eliminating inaccurate and undesirable results.

The circuit of the present invention may be applicable to various types of operations and the example described and shown is not to be considered in a limiting sense as to the use of the circuit. Additionally, it is obvious that the parameters can be changed in order to control the type of signal to be used.

I claim:

A circuit for controlling the output of direct current pulses applied to the input of the circuit comprising, a first amplifier having an output responsive to said input pulses, a first diode having a first terminal coupled to the output of said first amplifier, a first capacitor having a first terminal connected to the second terminal of said first diode, means for connecting the second terminal of said first capacitor to a direct current voltage source of opposite polarity to that of said input pulses, a variable resistor connected between said second terminal of said first diode and said means, a second diode having a first terminal connected to ground, a second capacitor connected between the output of said first amplifier and the second terminal of said second diode, a third diode having a first terminal connected to the second terminal of said second diode, a second amplifier having an input terminal, a resistor connecting the second terminal of said third diode to the input terminal of said second amplifier, a third capacitor connected between the second terminal of said third diode and ground, a fourth capacitor coupling the output of said first amplifier with the input terminal of said second amplifier, and an output terminal connected to the output of said second amplifier.

References Cited in the file of this patent

UNITED STATES PATENTS

| | | |
|---|---|---|
| 2,704,324 | Broadhead | Mar. 15, 1955 |
| 2,896,077 | Brandt | July 21, 1959 |
| 2,898,457 | Auerbach | Aug. 4, 1959 |